United States Patent
Matsuyama (10) Patent No.: US 8,736,218 B2
(45) Date of Patent: May 27, 2014

(54) POWER SUPPLY DEVICE FOR ELECTRIC VEHICLE

(75) Inventor: Tetsuya Matsuyama, Nara (JP)

(73) Assignee: Panasonic Corporation, Osaka (JP)

( * ) Notice: Subject to any disclaimer, the term of this patent is extended or adjusted under 35 U.S.C. 154(b) by 341 days.

(21) Appl. No.: 13/387,600

(22) PCT Filed: Jun. 20, 2011

(86) PCT No.: PCT/JP2011/003493
§ 371 (c)(1),
(2), (4) Date: Jan. 27, 2012

(87) PCT Pub. No.: WO2011/161925
PCT Pub. Date: Dec. 29, 2011

(65) Prior Publication Data
US 2012/0119683 A1      May 17, 2012

(30) Foreign Application Priority Data

Jun. 24, 2010   (JP) .................................. 2010-143300

(51) Int. Cl.
*H02P 27/04*   (2006.01)
(52) U.S. Cl.
USPC ............. 318/800; 318/801; 318/802; 318/66; 318/139
(58) Field of Classification Search
CPC ........................ Y02T 10/7225; Y02T 10/7044
USPC .................... 318/800–802, 66, 139
See application file for complete search history.

(56) References Cited

U.S. PATENT DOCUMENTS 5,717,310 A   2/1998 Sakai et al.
6,917,179 B2  7/2005 Komatsu et al.
(Continued)

FOREIGN PATENT DOCUMENTS

JP       9-163616       6/1997
JP      2003-230269    8/2003
(Continued)

*Primary Examiner* — Erick Glass
(74) *Attorney, Agent, or Firm* — Hamre, Schumann, Mueller & Larson, P.C.

(57) ABSTRACT

The present invention provides a power supply device for an electric vehicle that allows highly efficient operation of a compressor inverter. A power supply device for motor vehicle 10 has: a main circuit 13 having a power source 11, a DC-DC converter 18, and a main inverter 17 that drives a main motor 12; an auxiliary circuit 15 having an auxiliary inverter 19 that drives an auxiliary motor 14, a first electrical circuit 23 that is connected to the main circuit 13 on a primary side of the DC-DC converter 18, a second electrical circuit 24 that is connected to the main circuit 13 on a secondary side of the DC-DC converter 18, and a connection circuit 30 configured to be capable of selecting one of the first electrical circuit 23 and the second electrical circuit 24 as a path for supplying a direct current voltage to the auxiliary inverter 19; and a control device 16 that controls the connection circuit 30 when the main motor 12 is in power running operation so that switching between the first electrical circuit 23 and the second electrical circuit 24 is performed corresponding to a required voltage of the auxiliary inverter 19.

6 Claims, 11 Drawing Sheets

(56) References Cited

U.S. PATENT DOCUMENTS

| | | | |
|---|---|---|---|
| 7,164,253 B2 | 1/2007 | Sato et al. | |
| 7,764,044 B2 * | 7/2010 | Ishikawa et al. | 320/104 |
| 8,039,976 B2 | 10/2011 | Sato et al. | |
| 8,274,173 B2 * | 9/2012 | King et al. | 307/9.1 |
| 8,400,100 B2 * | 3/2013 | Takizawa et al. | 318/803 |
| 2010/0181829 A1 * | 7/2010 | Ichikawa et al. | 307/9.1 |
| 2010/0242481 A1 * | 9/2010 | Shamoto et al. | 60/698 |

FOREIGN PATENT DOCUMENTS

| | | |
|---|---|---|
| JP | 2003-244801 | 8/2003 |
| JP | 3797361 | 4/2006 |
| JP | 4048787 | 12/2007 |
| JP | 2008-074195 | 4/2008 |

* cited by examiner

POWER SUPPLY DEVICE FOR ELECTRIC VEHICLE

TECHNICAL FIELD

The present invention relates to a power supply device for an electric vehicle, particularly to a configuration for supplying power appropriately to a plurality of load devices whose required loads vary and a method for controlling the same.

BACKGROUND ART

In recent years, the necessity to decrease the degree of dependence on petroleum as an energy source has been pointed out from the viewpoint of reducing carbon dioxide emission and securing energy, for the purpose of which technologies have been actively developed. Among such technologies, hybrid vehicles and electric drive vehicles that use an electrical power source (battery) as a driving source have raised great expectations. In this description, hybrid vehicles and electric drive vehicles are collectively referred to as electric vehicles. Various attempts have been made in order to improve the use efficiency of electrical energy as a power source for electric vehicles.

Figure 9:
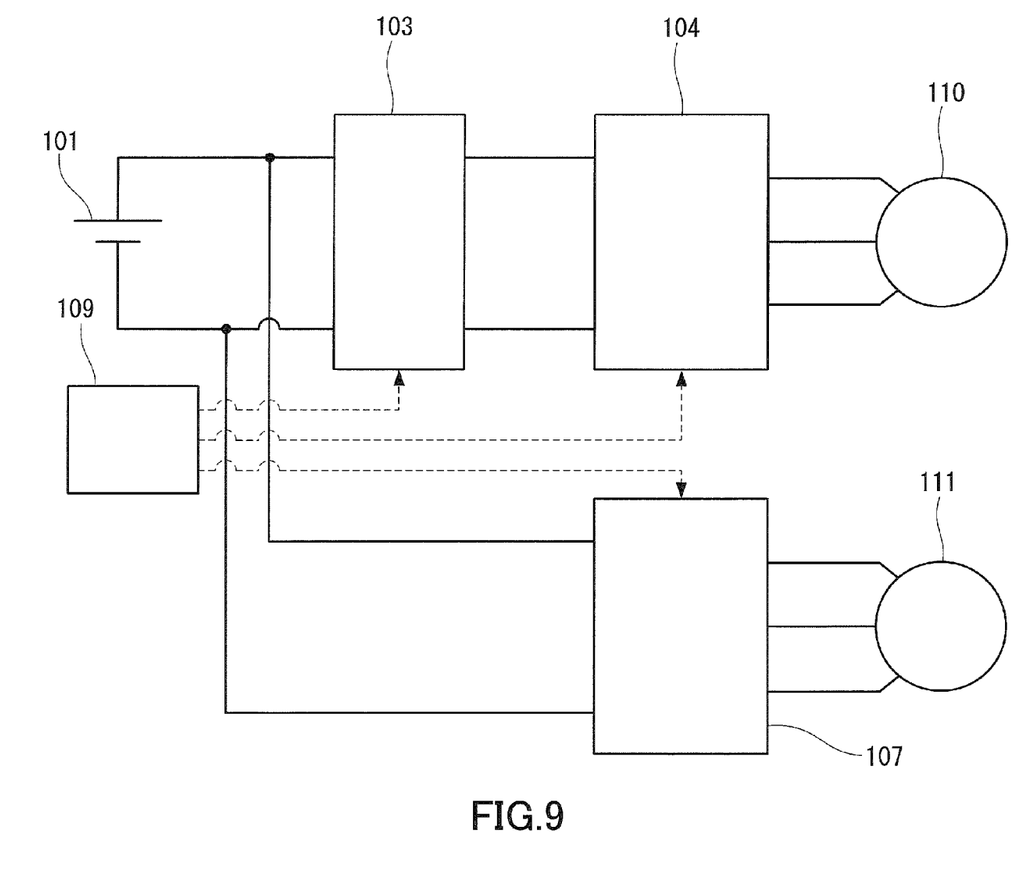
FIG. 9 is a schematic configuration diagram showing a conventional power supply device for an electric vehicle.

Patent Literature 1 discloses a system in which a DC-DC converter 103 is arranged between a high voltage power source 101 and a drive inverter 104, as shown in FIG. 9. In the system of Patent Literature 1, a control device 109 transmits control signals to the DC-DC converter 103 and the drive inverter 104, on the basis of the rotational speed and the torque of a drive motor 110. Thus, the boost ratio in the DC-DC converter 103 and the PWM duty in the drive inverter 104 are sequentially changed. Further, the control device 109 transmits control signals also to a compressor inverter 107, thereby sequentially changing the PWM duty in the compressor inverter 107 so as to supply an appropriate AC voltage to a compressor motor 111.

CITATION LIST

Patent Literature

Patent Literature 1: JP 4048787 B2

SUMMARY OF INVENTION

Technical Problem

In electric vehicles, the load to be applied to a compressor motor is high during starting of an air-conditioning system, while the load to be applied to the compressor motor is low during other periods. Accordingly, it is preferable, from the viewpoint of improving the efficiency of the air-conditioning system, to supply a direct current voltage of appropriate magnitude to a compressor inverter corresponding to the magnitude of the load applied to the compressor motor.

The system of Patent Literature 1 can drive the drive inverter 104 and the drive motor 110 at high efficiency and high output levels by changing the boost ratio in the DC-DC converter 103 corresponding to the rotational speed and the torque of the drive motor 110. However, no specific idea to adjust the direct current voltage applied to the compressor inverter 107 is disclosed therein.

The present invention has been accomplished in view of such circumstances, and an object thereof is to provide a power supply device for an electric vehicle capable of driving not only a main motor but also an auxiliary motor at high efficiency and high output levels.

Solution to Problem

In order to solve the above-mentioned problem, the present invention provide a power supply device for an electric vehicle intended to supply power of an direct current power source to a main motor and an auxiliary motor. The power supply device for an electric vehicle includes: a main circuit having a DC-DC converter that allows a direct current voltage of the power source to be stepped up and a main inverter that drives the main motor using an output from the DC-DC converter; an auxiliary circuit having an auxiliary inverter that drives the auxiliary motor, a first electrical circuit that is connected to the main circuit on the primary side of the DC-DC converter, a second electrical circuit that is connected to the main circuit on the secondary side of the DC-DC converter, and a connection circuit that is configured to be capable of selecting one of the first electrical circuit and the second electrical circuit as a path for supplying a direct current voltage to the auxiliary inverter; and a control device that controls the connection circuit when the main motor is in power running operation so that the first electrical circuit is selected by the connection circuit when the required voltage of the auxiliary inverter is lower than a direct current voltage of the power source while the second electrical circuit is selected by the connection circuit when the required voltage of the auxiliary inverter is equal to or higher than a direct current voltage of the power source.

Advantageous Effects of Invention

According to the present invention, the first electrical circuit is selected by the connection circuit when the required voltage of the auxiliary inverter is lower than the direct current voltage of the power source, while the second electrical circuit is selected by the connection circuit when the required voltage of the auxiliary inverter is equal to or higher than the direct current voltage of the power source. Thus, it is possible to supply a voltage to the auxiliary inverter corresponding to the required voltage of the auxiliary inverter. This leads to an enhancement in the power conversion efficiency of the auxiliary circuit. That is, not only the main motor but also the auxiliary motor can be driven at high efficiency and high output levels. Accordingly, the use efficiency of electrical energy stored in a power source of an electric vehicle can be enhanced.

DESCRIPTION OF EMBODIMENTS

Hereinafter, embodiments of the present invention are described in detail with reference to the drawings. In the embodiments, a configuration for driving a drive motor and a compressor motor is described. However, the present invention can be applied also to other devices.

(Embodiment)

Figure 1:
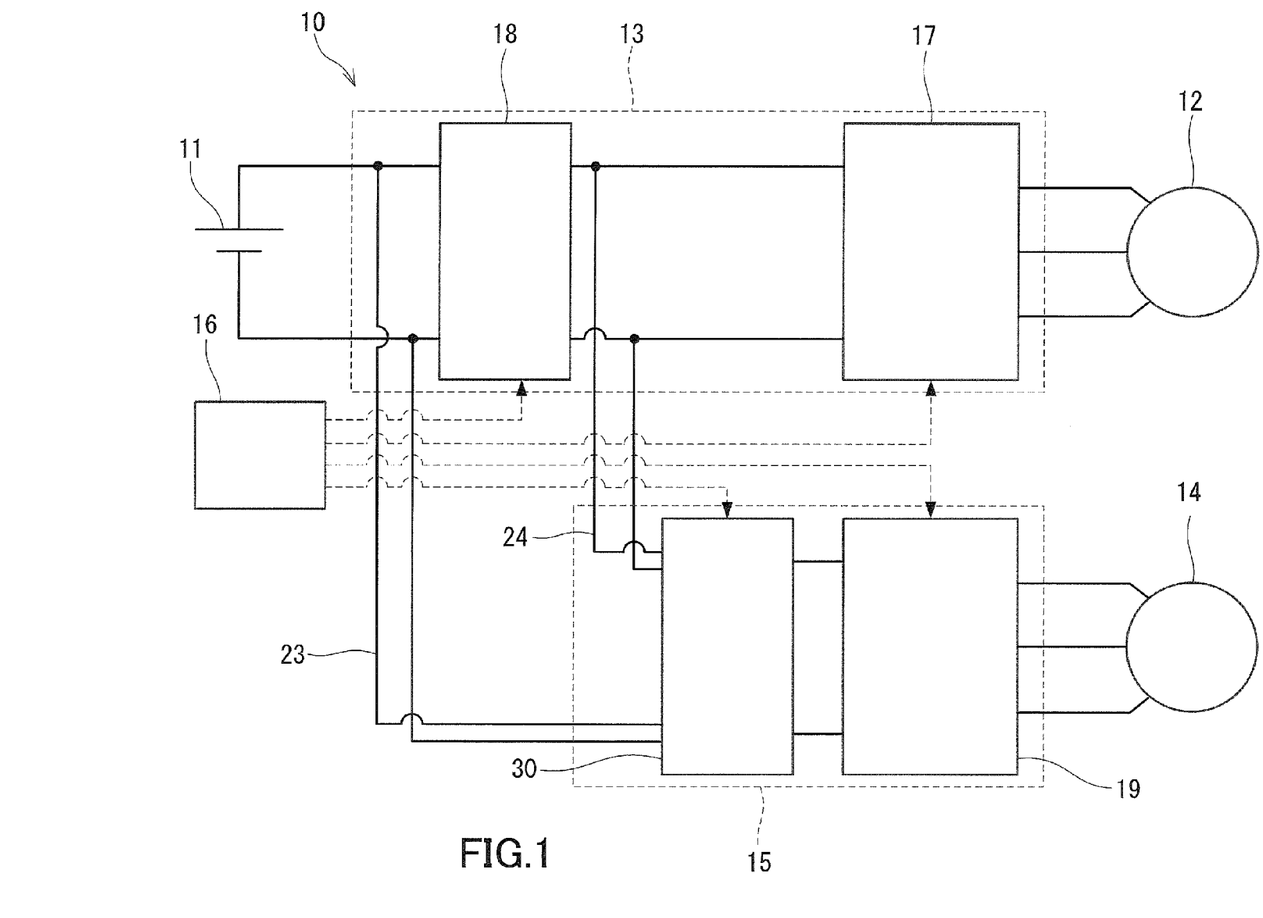
FIG. 1 is a schematic configuration diagram showing a power supply device for an electric vehicle as Embodiment of the present invention.

FIG. 1 is a configuration diagram showing a power supply device for an electric vehicle 10 in Embodiment. As shown in FIG. 1, the power supply device for an electric vehicle 10 includes a main circuit 13, an auxiliary circuit 15, and a control device 16. The main circuit 13 has a DC-DC converter 18 and a drive motor inverter 17, and is connected to a power source 11 and a drive motor 12. The auxiliary circuit 15 has a connection circuit 30 and a compressor inverter 19, and is connected to a compressor motor 14. In this regard, the drive motor 12 corresponds to the main motor of the present invention, the drive motor inverter 17 corresponds to the main inverter of the present invention, the compressor motor 14 corresponds to the auxiliary motor of the present invention, and the compressor inverter 19 corresponds to the auxiliary inverter of the present invention, respectively.

The auxiliary circuit 15 further has a first electrical circuit 23 and a second electrical circuit 24 for supplying power from the power source 11 to the connection circuit 30. The first electrical circuit 23 extends from between the power source 11 and the DC-DC converter 18 (that is, from the primary side of the DC-DC converter 18) to the connection circuit 30. The second electrical circuit 24 extends from between the DC-DC converter 18 and the drive motor inverter 17 (that is, from the secondary side of the DC-DC converter 18) to the connection circuit 30.

The power source 11 is a direct current power source and is capable of being charged and discharged with electric power. A secondary battery such as a nickel hydrogen battery and a lithium ion battery can be used as the power source 11. In addition, a high-capacity capacitor such as an electrical double layer capacitor also can be used as the power source 11.

On the basis of commands from the control device 16, the DC-DC converter 18 regulates an output voltage $V_{dc}$ and supplies it to the drive motor inverter 17. The output voltage $V_{dc}$ is determined on the basis of the rotational speed and the torque required by the drive motor inverter 17 and the compressor inverter 19, as described later. As the DC-DC converter 18, a chopper-type non-isolated boost converter, for example, can be used. As a method for driving the DC-DC converter 18, a PWM driving method such as one described in JP 4048787 B2 may be employed. In addition, the DC-DC converter 18 in which the output voltage $V_{dc}$ varies stepwise may be used.

The drive motor inverter 17 converts the output voltage $V_{dc}$ that has been stepped up in the DC-DC converter 18 into a desired three-phase AC and supplies it to the drive motor 12. As the drive motor inverter 17, a three-phase AC inverter using a semiconductor switching device such as a power MOSFET and IGBT can be used.

The drive motor 12 is a motor for running of an electric vehicle (an induction motor or a synchronous motor). The shaft power of the drive motor 12 is transmitted to the running wheels of the electric vehicle. Further, during braking of the electric vehicle, it is possible to supply power to the power source 11 or the compressor inverter 19 by allowing regenerative operation of the drive motor 12, which functions as a generator. A permanent magnet synchronous motor is preferably used as the drive motor 12, for example. In this embodiment, an interior permanent magnet synchronous motor (IP-MSM: Interior Permanent Magnet Synchronous Motor), which is one kind of permanent magnet motors, is used. The interior permanent magnet synchronous motor has saliency in which the d-axis inductance Ld and the q-axis inductance Lq are different from each other (generally, inverse saliency of Lq>Ld), and can use reluctance torque in addition to magnet torque. Therefore, the interior permanent magnet synchronous motor exhibits exceptionally high motor efficiency. Furthermore, the drive motor 12 is in regenerative operation during braking of and exhibits exceptionally high generator efficiency during the regenerative operation, as well.

The compressor inverter 19 converts the direct current voltage supplied from the connection circuit 30 to a desired three-phase AC and supplies it to the compressor motor 14. As the compressor inverter 19, a three-phase AC inverter using a semiconductor switching device such as a power MOSFET and IGBT can be used, for example.

The compressor motor 14 is a motor for operating a compressor mainly used for indoor air-conditioning of the electric vehicle. As the compressor motor 14, an induction motor and a synchronous motor such as an interior permanent magnet synchronous motor can be used, for example.

The control device 16 controls the DC-DC converter 18, the drive motor inverter 17, the compressor inverter 19, and the connection circuit 30. A required voltage $V_{main}$ of the drive motor inverter 17 can be easily determined by substitution of values, such as the opening degree of the accelerator (that is, the required torque), the current rotational speed of the drive motor 12, and the device parameter of the drive motor 12, into the voltage equation of the motor. A required voltage $V_{comp}$ of the compressor inverter 19 can be easily determined by substitution of values, such as necessary performance (that is, the torque and the rotational speed necessary for compression load) that is calculated from a current room temperature T and a set temperature $T_{ref}$, the current rotational speed of the compressor motor 14, and the device parameter of the compressor motor 14, into the voltage equation of the motor. It also is possible to use a table, etc., stored in a memory beforehand, instead of the voltage equation, or to use both the voltage equation and such a table. The connection circuit 30 and the boost ratio in the DC-DC converter 18 are controlled on the basis of a power source voltage $V_{batt}$, the required voltage $V_{main}$ of the drive motor inverter 17, and the required voltage $V_{comp}$ of the compressor inverter 19, as described later. As the control device 16, a microcomputer or a DSP (digital signal processor) may be used, for example.

Figure 2:
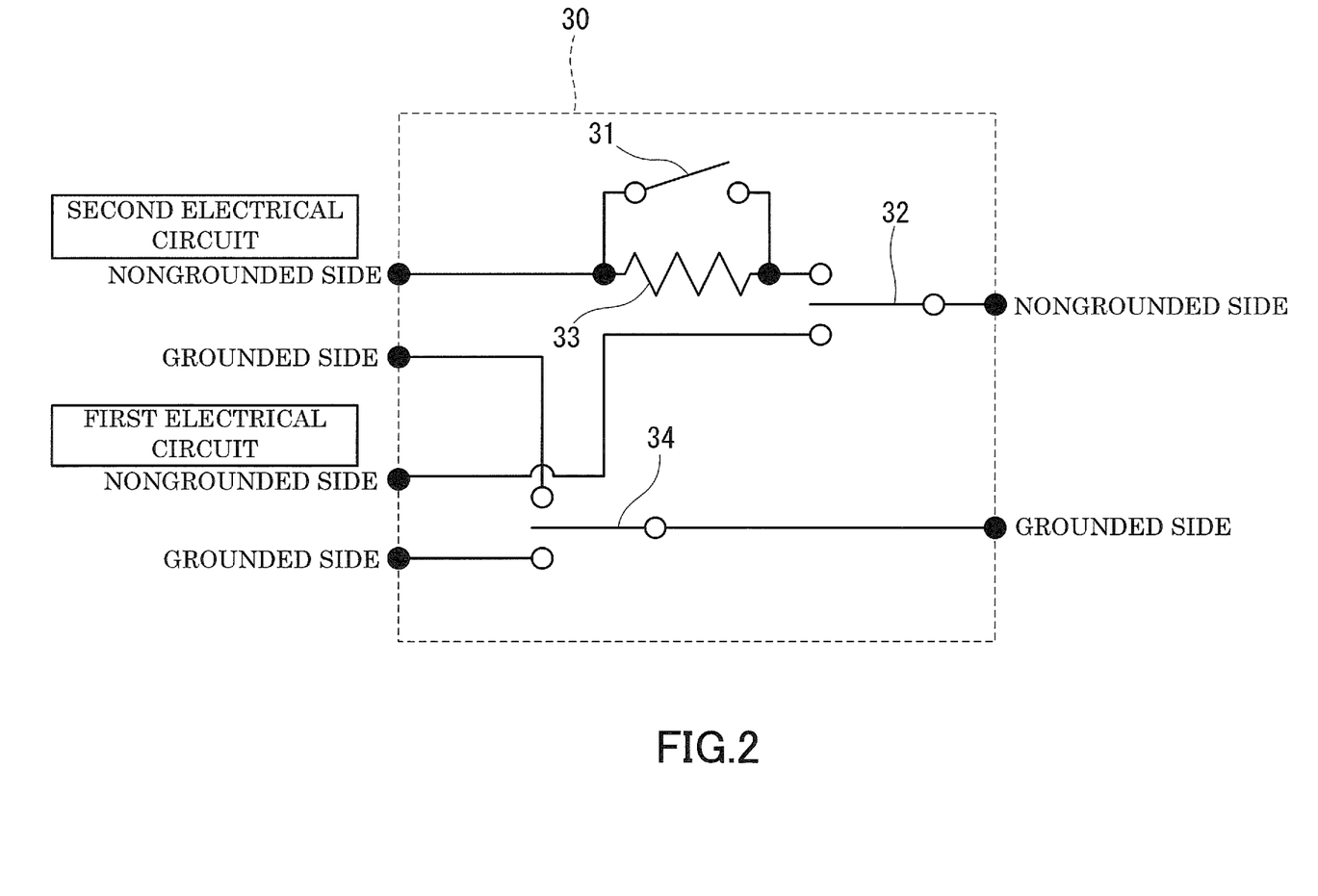
FIG. 2 is a schematic configuration diagram showing a connection circuit in Embodiment of the present invention.

On the basis of commands from the control device 16, the connection circuit 30 selects the first electrical circuit 23 or the second electrical circuit 24 and supplies power to the compressor inverter 19. FIG. 2 is a configuration diagram of the connection circuit 30 in this embodiment. The connection circuit 30 has a first switch 32 on the nongrounded side, a second switch 34 on the grounded side, and an inrush limiting resistor 33. A single pole double throw switch, for example, may be used for the first switch 32 and the second switch 34.

The first switch 32 selectively connects one of the electrical circuit on the nongrounded side in the first electrical circuit 23 and the electrical circuit on the nongrounded side in the second electrical circuit 24 to the terminal on the nongrounded side of the compressor inverter 19. The second switch 34 selectively connects one of the electrical circuit on the grounded side in the first electrical circuit 23 and the electrical circuit on the grounded side in the second electrical circuit 24 to the terminal on the grounded side of the compressor inverter 19.

Further, the connection circuit 30 is provided with the inrush limiting resistor 33 and a third switch 31 that is a single pole single throw switch in parallel to the inrush limiting resistor 33. By providing the inrush limiting resistor 33 and appropriately controlling the third switch 31, it is possible to avoid an inrush current that has occurred at the time when the path for supplying power to the connection circuit 30 is switched from the first electrical circuit 23 to the second electrical circuit 24.

The inrush limiting resistor 33 is preferably capable of handling high power and may be composed, for example, of a wire wound resistor. Further, the first switch 32, the second switch 34, and the third switch 31 also are preferably capable of handling high power. Each switch may be a mechanical switch or a semiconductor switch, or may be composed of a hybrid switch combining them.

Figure 3A:
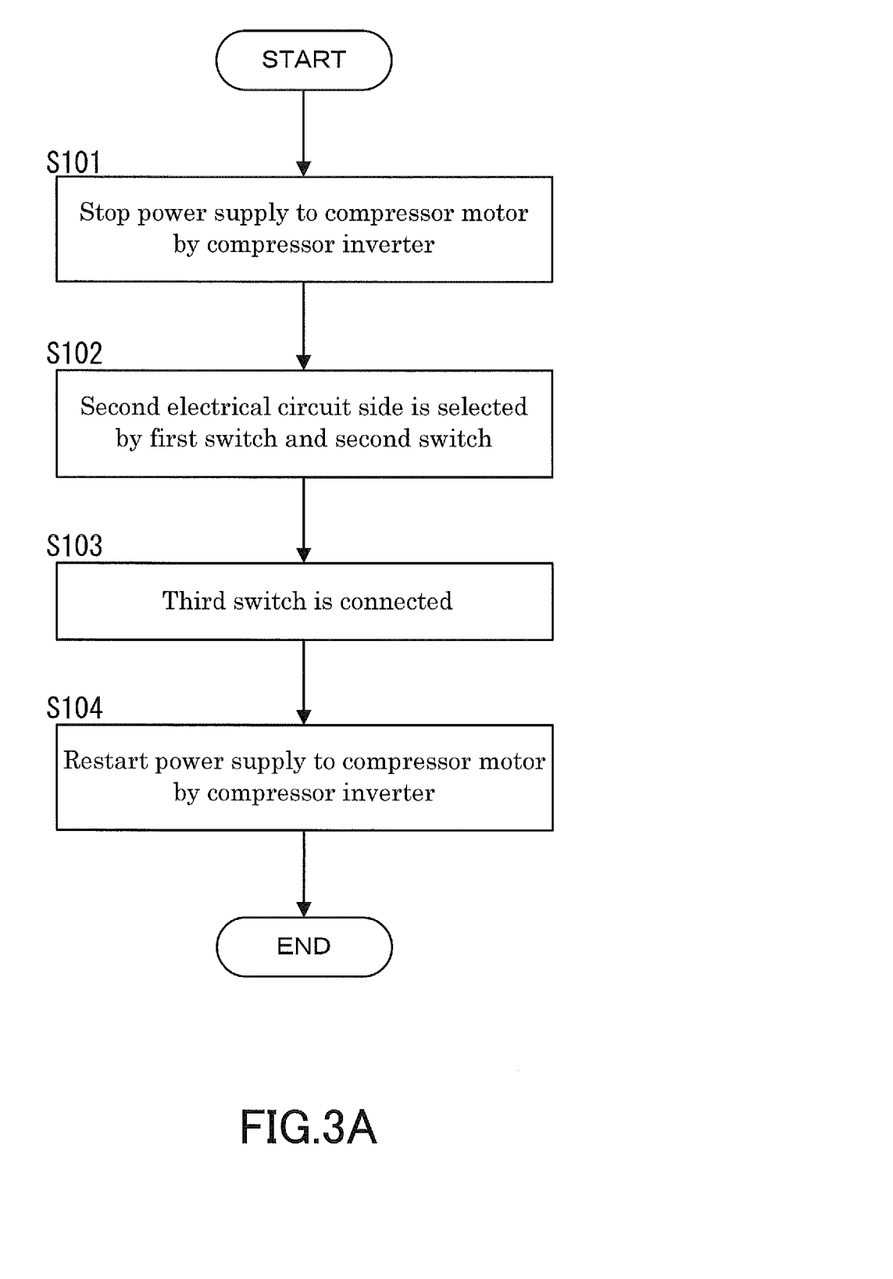
FIG. 3A is a flow chart of a method for controlling the connection circuit.
Figure 3B:
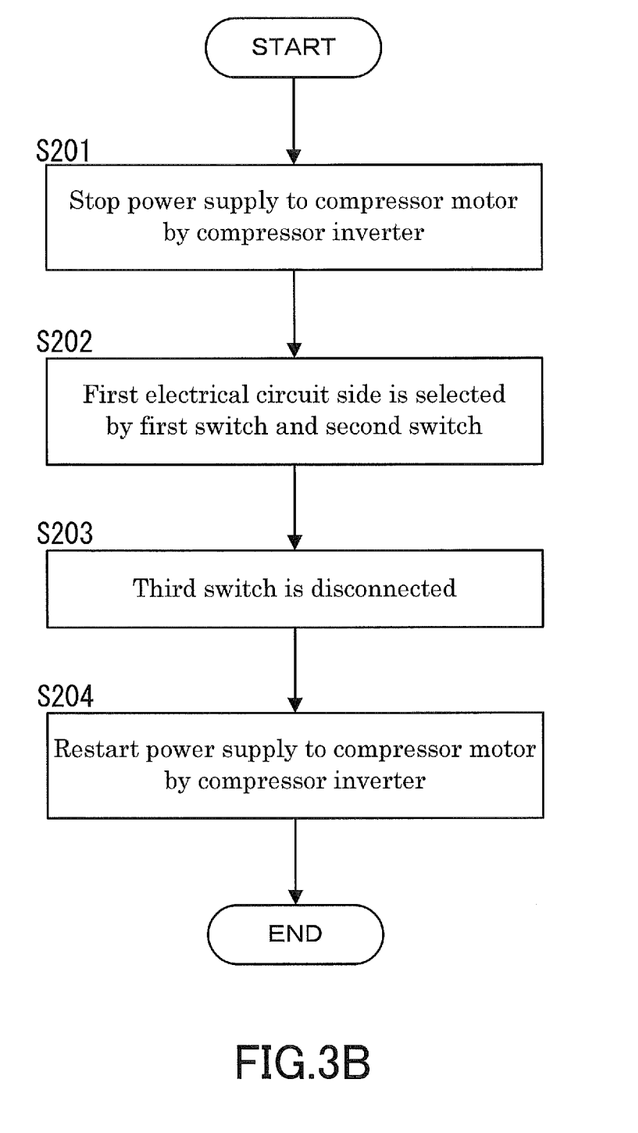
FIG. 3B is a flow chart of a method for controlling the connection circuit.

Next, a description is given with reference to the flow chart of FIG. 3 for the control of the first switch 32, the second switch 34, the third switch 31, and the compressor inverter 19 to be performed by the control device 16 at the time when the path for supplying power to the compressor inverter 19 is switched.

FIG. 3A is a flow chart of the steps performed when a first state where the connection circuit 30 connects between the first electrical circuit 23 and the compressor inverter 19 is switched to a second state where it connects between the second electrical circuit 24 and the compressor inverter 19. In the first state, the third switch 31 is disconnected. Further, the first electrical circuit 23 side is selected by the first switch 32 and the second switch 34.

When the first state is transferred to the second state, power supply to the compressor motor 14 by the compressor inverter 19 is first stopped (step 101). Next, the first switch 32 and the second switch 34 are allowed to select the second electrical circuit 24 side (step 102). Next, after a certain time has elapsed from step 102, the third switch 31 is connected (step 103). Finally, power supply to the compressor motor 14 by the compressor inverter 19 is restarted (step 104).

As mentioned above, the third switch 31 is disconnected when the first switch 32 and the second switch 34 are switched from the first electrical circuit 23 side to the second electrical circuit 24 side. This allows an inrush current that has occurred at the time of switching to pass through the inrush limiting resistor 33. That is, the control based on this flow can suppress the inrush current, thereby preventing the compressor inverter 19 from being damaged due to the inrush current.

Meanwhile, the control based on the flow shown in FIG. 3B is performed at the time when the connection circuit 30 is switched from the second state to the first state. In the second state, the third switch 31 is connected. Further, the second electrical circuit 24 side is selected by the first switch 32 and the second switch 34.

When the second state is transferred to the first state, power supply to the compressor motor 14 by the compressor inverter 19 is first stopped (step 201). Next, the first switch 32 and the second switch 34 are allowed to select the first electrical circuit 23 side (step 202). Next, after a certain time has elapsed from step 202, the third switch 31 is disconnected (step 203). Finally, power supply to the compressor motor 14 by the compressor inverter 19 is restarted (step 204).

In the control based on the flow shown in FIG. 3B, power supply to the compressor motor 14 by the compressor inverter 19 is stopped at the time when the first switch 32 and the second switch 34 are switched from the second electrical circuit 24 side to the first electrical circuit 23 side. Therefore, the transient phenomenon that has occurred in the connection circuit 30 can be prevented from affecting the compressor inverter 19. It should be noted that it does not matter if step 202 and step 203 are reversed in this flow.

Next, the control of the DC-DC converter 18 and the connection circuit 30 performed by the control device 16 is described in detail. The control device 16 controls the connection circuit 30 and the DC-DC converter 18 on the basis of the running pattern of the electric vehicle and the operation state of the air-conditioning system. Hereinafter, this control is described with reference to the flow chart of FIG. 4.

Figure 4:
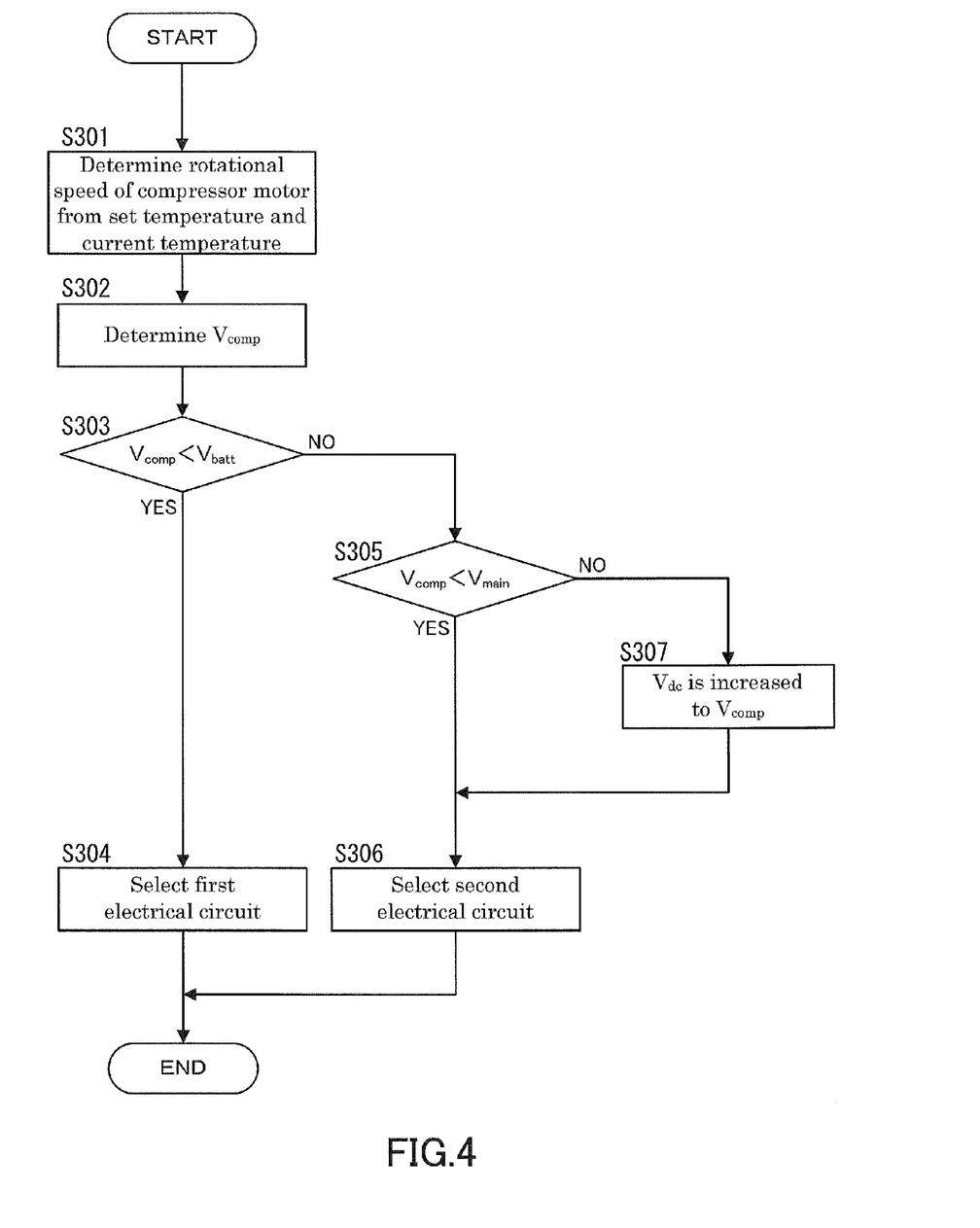
FIG. 4 is a flow chart of a method for controlling the power supply device for an electric vehicle of Embodiment of the present invention.

First, a target rotational speed of the compressor motor 14 is determined on the basis of the set temperature $T_{ref}$ in the air-conditioning system and the current room temperature T (step 301). Next, in order to allow the compressor motor 14 to rotate at the determined target rotational speed, the required voltage $V_{comp}$ to be supplied to the compressor inverter 19 is determined (step 302). In step 302, the control device 16 can determine the required voltage $V_{comp}$, for example, by referring to the current rotational speed of the compressor motor 14 and the rotational speed determined in step 301 and then using a voltage equation or a table of the motor in a program stored in the control device 16. In this embodiment, the required voltage $V_{comp}$ to be supplied to the compressor inverter 19 should be set to a higher value than the effective value of the AC voltage to be supplied to the compressor motor 14.

Next, the determined required voltage $V_{comp}$ and the power source voltage $V_{batt}$ are compared to each other (step 303).

When the required voltage $V_{comp}$ is lower than the power source voltage $V_{batt}$, the connection circuit 30 selects the first electrical circuit 23 (step 304). On the other hand, when the required voltage $V_{comp}$ is equal to or higher than the power source voltage $V_{batt}$, the process proceeds to step 305.

In step 305, the required voltage $V_{comp}$ and the required voltage $V_{main}$ of the drive motor inverter 17 are compared to each other. When the required voltage $V_{comp}$ is lower than the required voltage $V_{main}$, the connection circuit 30 selects the second electrical circuit 24 (step 306). On the other hand, when the required voltage $V_{comp}$ is equal to or higher than the required voltage $V_{main}$, the output voltage $V_{dc}$ is regulated so that the output voltage $V_{dc}$ should be equal to the required voltage $V_{comp}$ (step 307). Thereafter, the second electrical circuit 24 is selected (step 306).

Figure 5:
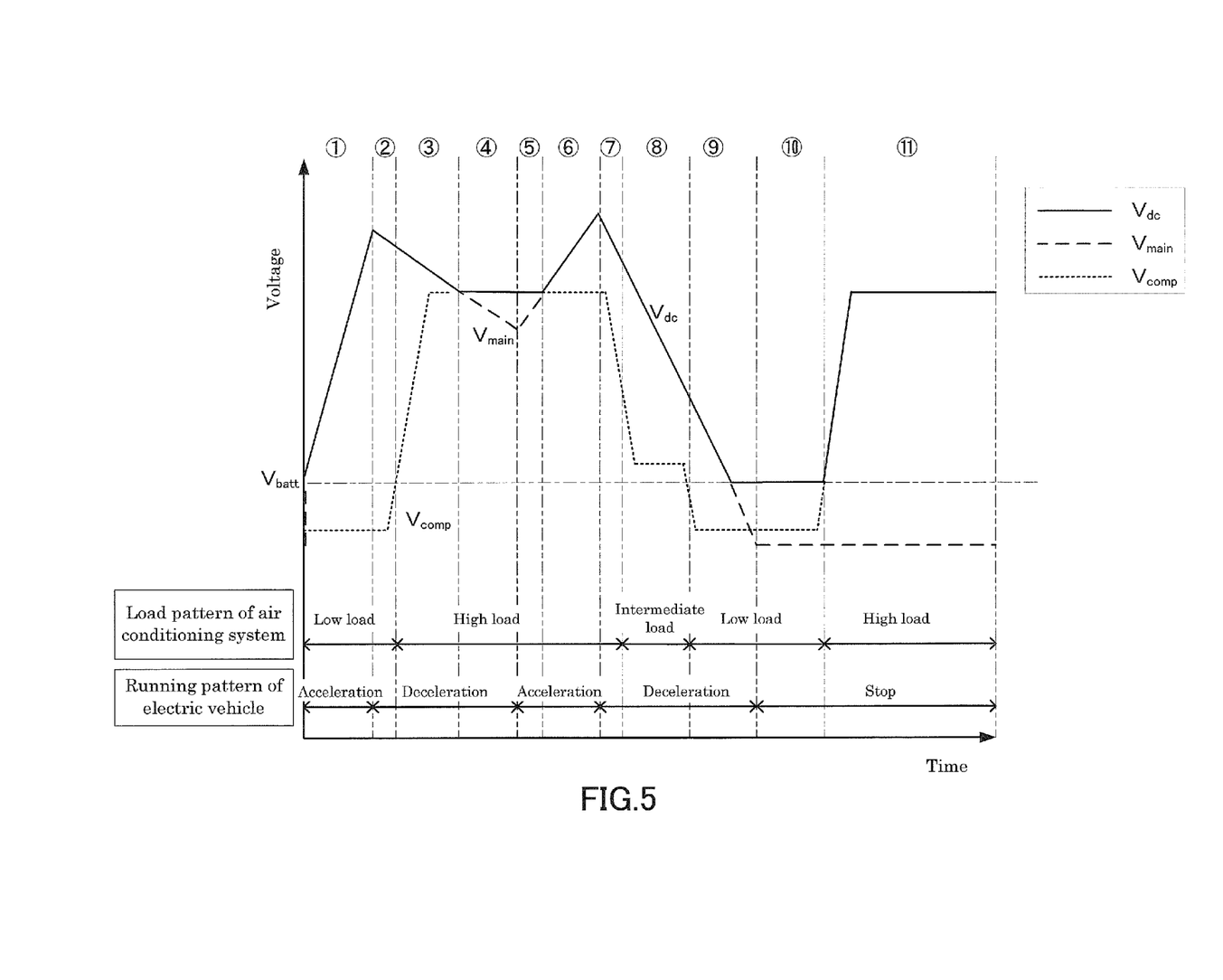
FIG. 5 is a timing chart showing how an output voltage $V_{dc}$ after being stepped up varies on the basis of the running pattern of the electric vehicle and the operation state of the air-conditioning system.

Next, the variation of the output voltage $V_{dc}$ by the control based on the above-mentioned flow is specifically described with reference to FIG. 5. FIG. 5 indicates the variation of the output voltage $V_{dc}$ when the running pattern of the electric vehicle (stop/acceleration/deceleration) and the load of the air-conditioning system (low load/intermediate load/high load) are varied.

When the electric vehicle starts (acceleration) with the air-conditioning system having a low load, the time proceeds to period 1. In period 1, the required voltage $V_{comp}$ is lower than the power source voltage $V_{batt}$. Accordingly, the first electrical circuit 23 is selected by the connection circuit 30 (YES in step 303 of FIG. 4). Further, the required voltage $V_{main}$ increases as the electric vehicle accelerates. In period 1, the output voltage $V_{dc}$ is not related to the operation of the compressor inverter 19, and determined only by the requirement of the drive motor inverter 17. Accordingly, the output voltage $V_{dc}$ increases following the required voltage $V_{main}$ in period 1.

Next, as the electric vehicle decelerates (braking operation), the required voltage $V_{main}$ decreases (period 2). In period 2, the required voltage $V_{comp}$ is lower than the power source voltage $V_{batt}$. Accordingly, the first electrical circuit 23 is selected by the connection circuit 30 (YES in step 303 of FIG. 4). The output voltage $V_{dc}$ decreases following the required voltage $V_{main}$ in period 2.

Next, when the air-conditioning system is switched to high load operation, the required voltage $V_{comp}$ increases. At the timing when the relationship between the magnitude of the required voltage $V_{comp}$ and the magnitude of the power source voltage $V_{batt}$ is reversed, the required voltage $V_{main}$ decreases but the required voltage $V_{comp}$ is still lower than $V_{main}$. Accordingly, the connection circuit 30 selects the second electrical circuit 24 at this timing (NO in step 303 and YES in step 305 of FIG. 4), and the time proceeds to period 3. The output voltage $V_{dc}$ decreases following the required voltage $V_{main}$ in period 3.

In period 3, as the electric vehicles decelerates (braking operation), the required voltage $V_{main}$ decreases. At the timing when the relationship between the magnitude of the required voltage $V_{main}$ and the magnitude of the required voltage $V_{comp}$ is reversed, the required voltage $V_{comp}$ is equal to or higher than the power source voltage $V_{batt}$. Accordingly, the boost ratio in the DC-DC converter 18 is regulated so that the output voltage $V_{dc}$ should be increased to the voltage $V_{comp}$ (period 4). Further, the second electrical circuit 24 is selected by the connection circuit 30 (NO in step 303 and NO in step 305 of FIG. 4).

Next, as the electric vehicle accelerates, the time proceeds to period 5. In period 5, the required voltage $V_{comp}$ is equal to or higher than the power source voltage $V_{batt}$. Further in period 5, the required voltage $V_{comp}$ is equal to or higher than the required voltage $V_{main}$. Accordingly, the output voltage $V_{dc}$ is increased to the required voltage $V_{comp}$. Further, the second electrical circuit 24 is selected by the connection circuit 30 (NO in step 303 and NO in step 305 of FIG. 4).

In period 5, as the electric vehicle accelerates, the required voltage $V_{main}$ increases. At the timing when the relationship between the magnitude of the required voltage $V_{main}$ and the magnitude of the required voltage $V_{comp}$ is reversed, the required voltage $V_{comp}$ is equal to or higher than the power source voltage $V_{batt}$. Accordingly, the connection circuit 30 selects the second electrical circuit 24 (NO in step 303 and YES in step 305 of FIG. 4), and the time proceeds to period 6. The output voltage $V_{dc}$ increases following the required voltage $V_{main}$ in period 6.

Next, as the electric vehicle decelerates (braking operation), the time proceeds to period 7. In period 7, the required voltage $V_{main}$ decreases, but the required voltage $V_{comp}$ is still lower than the $V_{main}$. Further in period 7, the required voltage $V_{comp}$ is equal to or higher than the power source voltage $V_{batt}$. Accordingly, the second electrical circuit 24 is selected by the connection circuit 30 (NO in step 303 and YES in step 305 of FIG. 4). The output voltage $V_{dc}$ decreases following the required voltage $V_{main}$ in period 7.

Next, when the air-conditioning system reaches nearly the desired temperature $T_{ref}$ and the air-conditioning system is switched to an intermediate load operation, the required voltage $V_{comp}$ decreases (period 8). In period 8, the required voltage $V_{comp}$ is equal to or higher than the power source voltage $V_{batt}$. Further in period 8, the required voltage $V_{main}$ decreases, but the required voltage $V_{comp}$ is still lower than the required voltage $V_{main}$. Accordingly, the second electrical circuit 24 is selected by the connection circuit 30 (NO in step 303 and YES in step 305 of FIG. 4). The output voltage $V_{dc}$ decreases following the required voltage $V_{main}$ in period 8.

Next, when the air-conditioning system is switched to low load operation, the required voltage $V_{comp}$ decreases, the relationship between the magnitude of the power source voltage $V_{batt}$ and the magnitude of the required voltage $V_{comp}$ is reversed, and the required voltage $V_{comp}$ falls below the power source voltage $V_{batt}$. Accordingly, the connection circuit 30 selects the first electrical circuit 23 (YES in step 303 of FIG. 4), the time proceeds to period 9. The output voltage $V_{dc}$ decreases following the required voltage $V_{main}$ in period 9.

After period 9, when the electric vehicle has stopped, the required voltage $V_{main}$ decreases to zero (period 10). In period 10, the required voltage $V_{comp}$ is lower than the power source voltage $V_{batt}$. Accordingly, the first electrical circuit 23 is selected by the connection circuit 30 (YES in step 303 of FIG. 4). In period 10, the output voltage $V_{dc}$ is equal to the power source voltage $V_{batt}$ (that is, the DC-DC converter 18 is not in boost operation).

Next, when the air-conditioning system is switched to high load operation while the electric vehicle is stopped, the required voltage $V_{comp}$ increases (period 11). In period 11, the required voltage $V_{comp}$ is equal to or higher than the power source voltage $V_{batt}$. Further in period 11, the required voltage $V_{comp}$ is equal to or higher than the required voltage $V_{main}$. Accordingly, the output voltage $V_{dc}$ is increased to the voltage $V_{comp}$. Further, the second electrical circuit 24 is selected by the connection circuit 30 (NO in step 303 and NO in step 305 of FIG. 4).

As described above, according to this embodiment, the first electrical circuit 23 is selected when the required voltage $V_{comp}$ to be supplied to the compressor inverter 19 is lower than the power source voltage $V_{batt}$, while the second electrical circuit 24 is selected when the required voltage $V_{comp}$ is equal to or higher than the power source voltage $V_{batt}$. This allows an appropriate voltage to be supplied to the compressor inverter 19 even when the required voltage $V_{comp}$ to be supplied to the compressor inverter 19 varies.

Furthermore, according to this embodiment, in the case where the required voltage $V_{comp}$ is equal to or higher than the power source voltage $V_{batt}$ as well as the required voltage $V_{comp}$ is equal to or higher than the required voltage $V_{main}$ of the drive motor inverter 17, the control device 16 controls the DC-DC converter 18 so that the output voltage $V_{dc}$ should be equal to the required voltage $V_{comp}$ in the DC-DC converter 18. Such control enables the power supply device for an electric vehicle 10 to supply a necessary voltage to the compressor inverter 19 even when the required voltage $V_{comp}$ to be supplied to the compressor inverter 19 increases.

Moreover, since power is supplied from the primary side of the DC-DC converter 18 when the required voltage $V_{comp}$ is lower than the power source voltage $V_{batt}$ (in low load operation), power can be supplied from the power source 11 to the compressor inverter 19 without the intermediation of the DC-DC converter 18. That is, losses in the DC-DC converter 18 can be reduced. This can improve the COP (coefficient of performance) of the air-conditioning system.

In this embodiment, the output voltage $V_{dc}$ is set to be equal to or higher than both the required voltage $V_{main}$ and the required voltage $V_{comp}$, as shown in FIG. 5. This is intended to secure a minimum voltage to be supplied to each of the drive motor 12 and the compressor motor 14. However, it also is possible to provide certain margins $\Delta V1$ and $\Delta V2$ (for example, 2 to 3V) for the required voltage $V_{main}$ and the required voltage $V_{comp}$, in order to allow stable operation of the drive motor 12 and the compressor motor 14. That is, the required voltage $V_{main}+\Delta V1$(=the required voltage $V_{main}'$) and the required voltage $V_{comp}+\Delta V2$(=the required voltage $V_{comp}'$) may be used instead of the required voltage $V_{main}$ and the required voltage $V_{comp}$ in steps 303, 305 and 307 of FIG. 4, and FIG. 5. Thus, the respective voltages to be supplied to the drive motor 12 and the compressor motor 14 are made higher than the minimum voltages to be supplied, so that the drive motor 12 and the compressor motor 14 can be stably operated.

Further, it also is possible to connect both the electrical circuit on the grounded side in the first electrical circuit 23 and the electrical circuit on the grounded side in the second electrical circuit 24 to the terminal on the grounded side of the compressor inverter 19 on a constant basis, without providing the second switch 34 of the connection circuit 30. This reduces the number of components of the connection circuit 30, compared to the case of providing the second switch 34, thereby resulting in lower material cost and higher reliability of the connection circuit 30. It should be noted that the inrush limiting resistor 33 may be omitted when the inrush current is sufficiently low.

(Modified Embodiment)

Hereinafter, Modified embodiment of the present invention is described. The power supply device for an electric vehicle 10 of Modified embodiment can efficiently supply power obtained by the drive motor 12 functioning as a generator through braking operation (regenerative operation) to the compressor inverter 19, as described later. In this embodiment, the same components as those in Embodiment are denoted by the same reference numerals, and the descriptions thereof are omitted.

Figure 6:
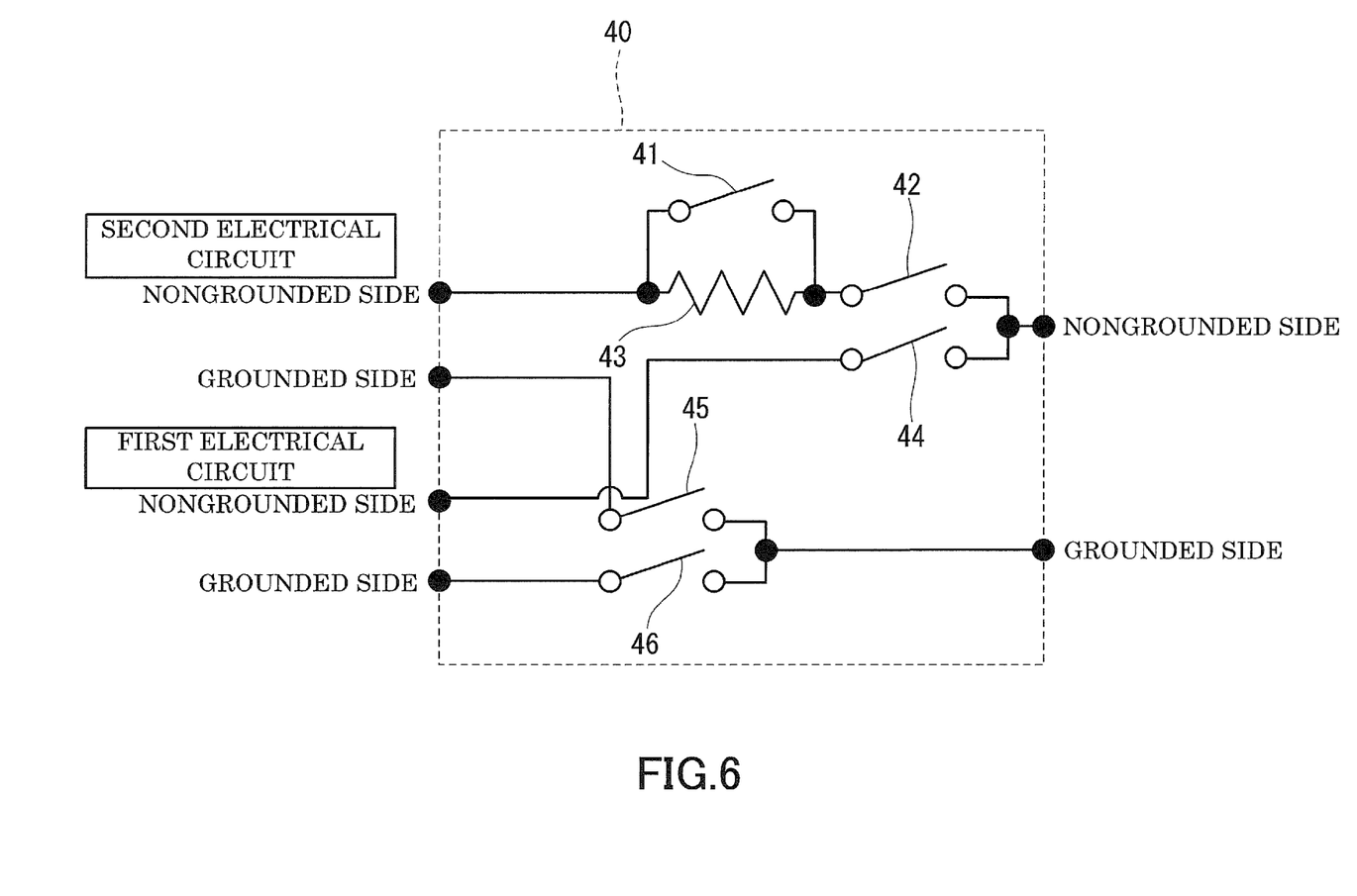
FIG. 6 is a schematic configuration diagram showing a connection circuit in Modified embodiment of the present invention.

The power supply device for an electric vehicle 10 of Modified embodiment has a configuration with a different connection circuit as compared to Embodiment. FIG. 6 shows the configuration of a connection circuit 40 in Modified embodiment.

All the switches included in the connection circuit 40 each are a single pole single throw switch. A fourth switch 42 connects or disconnects between the electrical circuit on the nongrounded side in the second electrical circuit 24 and the terminal on the nongrounded side of the compressor inverter 19. A fifth switch 44 connects or disconnects between the electrical circuit on the nongrounded side in the first electrical circuit 23 and the terminal on the nongrounded side of the compressor inverter 19. A sixth switch 45 connects or disconnects between the electrical circuit on the grounded side in the second electrical circuit 24 and the terminal on the grounded side of the compressor inverter 19. A seventh switch 46 connects or disconnects between the electrical circuit on the grounded side in the first electrical circuit 23 and the terminal on the grounded side of the compressor inverter 19.

Further, an eighth switch 41 and an inrush limiting resistor 43 respectively correspond to the third switch 31 and the inrush limiting resistor 33 of Embodiment, and their functions also are the same as those in Embodiment.

Figure 7A:
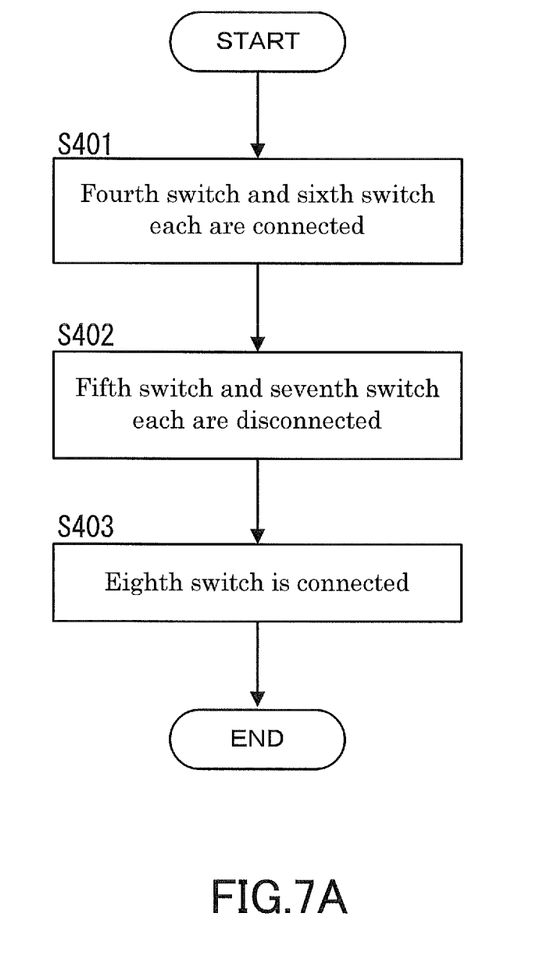
FIG. 7A is a flow chart of a method for controlling the connection circuit.
Figure 7B:
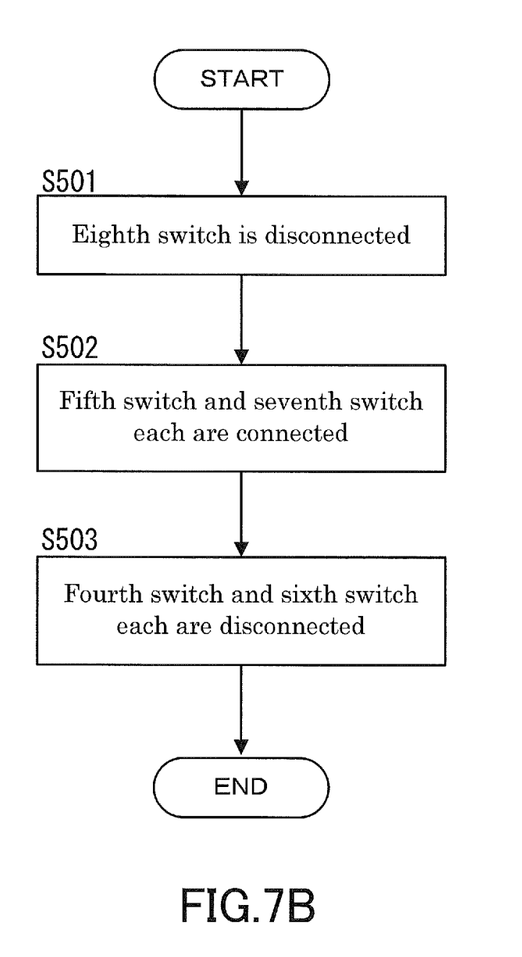
FIG. 7B is a flow chart of a method for controlling the connection circuit.

Next, a description is given with reference to the flow chart of FIG. 7 for the control of the fourth switch 42, the fifth switch 44, the sixth switch 45, the seventh switch 46, and the eighth switch 41 performed by the control device 16 at the time when switching between the first electrical circuit 23 and the second electrical circuit 24 in the connection circuit 40 is performed.

FIG. 7A is a flow chart of the steps performed when a first state where the connection circuit 40 connects between the first electrical circuit 23 and the compressor inverter 19 is switched to a second state where it connects between the second electrical circuit 24 and the compressor inverter 19. In the first state, the eighth switch 41 is disconnected. Further, the fourth switch 42 and the sixth switch 45 are disconnected, while the fifth switch 44 and the seventh switch 46 are connected.

When the first state is transferred to the second state, the fourth switch 42 and the sixth switch 45 each are first connected (step 401). After a certain time has elapsed from step 401, the fifth switch 44 and the seventh switch 46 each are disconnected (step 402). Then, the eighth switch 41 is connected (step 403).

According to the control of the connection circuit 40 of this configuration based on the flow chart of FIG. 7, at least one of the first electrical circuit 23 and the second electrical circuit 24 is connected to the compressor inverter 19 on a constant basis. In other words, the compressor motor 14 is supplied with a voltage at any time. This enables switching from the first electrical circuit 23 to the second electrical circuit 24 without stopping the operation of the compressor motor 14. The inrush limiting resistor 43 suppresses an inrush current in the same manner as the inrush limiting resistor 33.

When the connection circuit 40 is switched from the second state to the first state, the control based on the flow of FIG. 7B is performed. In the second state, the eighth switch 41 is connected. Further, the fourth switch 42 and the sixth switch 45 each are connected, while the fifth switch 44 and the seventh switch 46 each are disconnected.

When the second state is transferred to the first state, the eighth switch 41 is first disconnected (step 501). Then, the fifth switch 44 and the seventh switch 46 each are connected (step 502). After a certain time has elapsed from step 502, the fourth switch 42 and the sixth switch 45 each are disconnected (step 503).

In the control based on the flow of FIG. 7B, in the same manner as in the control based on the flow of FIG. 7A, at least one of the first electrical circuit 23 and the second electrical circuit 24 is connected to the compressor inverter 19 on a constant basis, and therefore it is possible to switch the second electrical circuit 24 to the first electrical circuit 23 without stopping power supply to the compressor motor 14.

Figure 8:
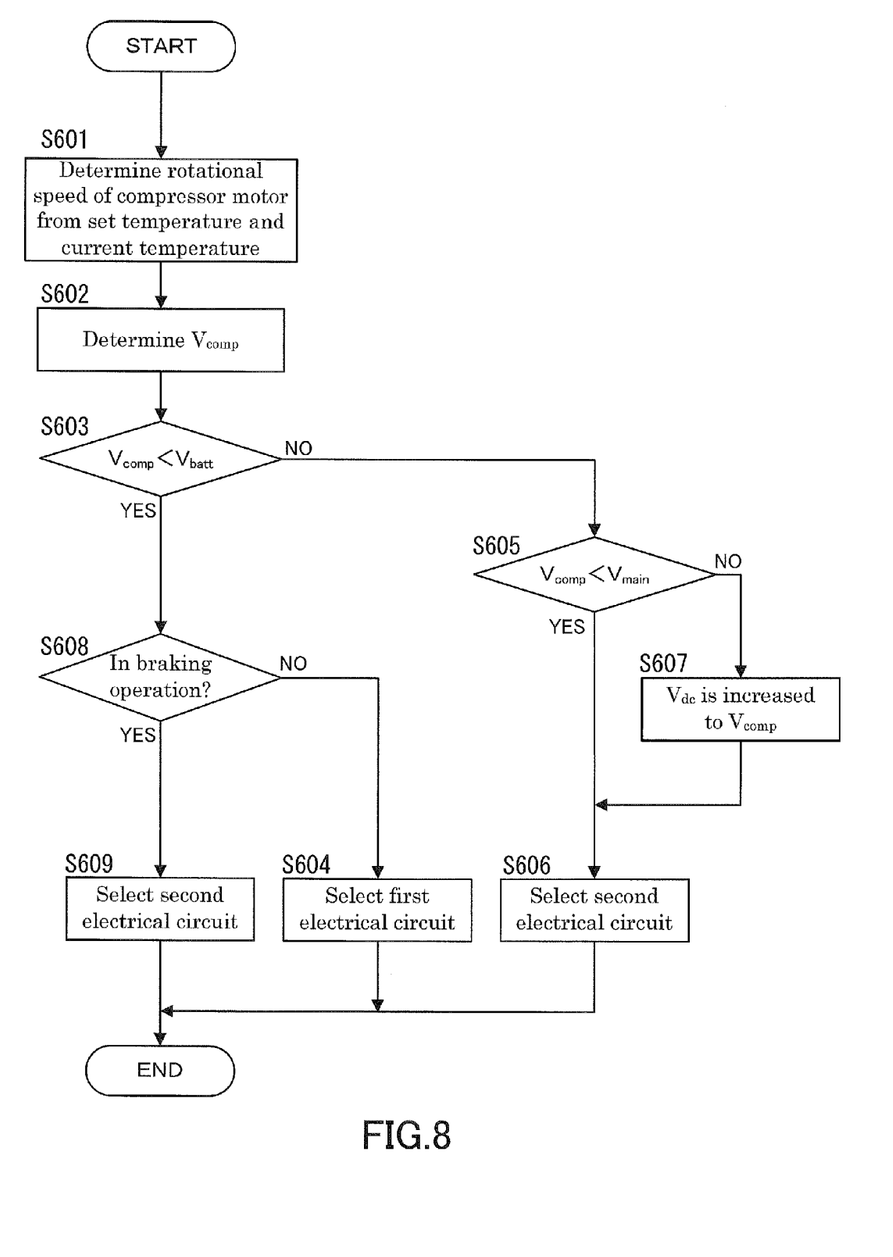
FIG. 8 is a flow chart of a method for controlling a power supply device for an electric vehicle as Modified embodiment of the present invention.

Next, the control of the DC-DC converter 18 and the connection circuit 40 performed by the control device 16 in Modified embodiment is described with reference to the flow chart of FIG. 8. Steps 601 to 603 and steps 605 to 607 in the flow of FIG. 8 correspond to steps 301 to 303 and steps 305 to 307 in the flow of FIG. 4. Hereinafter, only the steps (steps 604, 608 and 609) that are different from those in the flow of FIG. 4 are described.

In step 603, when the required voltage $V_{comp}$ is lower than the power source voltage $V_{batt}$, the process proceeds to step 608. In step 608, whether or not the drive motor 12 is in braking operation is determined. In the case where the drive motor 12 is in braking (regenerative) operation, the connection circuit 40 selects the second electrical circuit 24 (step 609). On the other hand, in the case where the drive motor 12 is not in braking operation but in power running operation, the connection circuit 40 selects the first electrical circuit 23 (step 604).

Next, the variation of the output voltage $V_{dc}$ resulting from the control based on the above-mentioned flow is specifically described with reference to FIG. 5. In the following description, only the periods (periods 1, 2, 9, and 10) in the flow of FIG. 8 relevant to the steps (steps 604, 608 and 609) that are different from those in the flow of FIG. 4 are described.

When the electric vehicle starts (acceleration) with the air-conditioning system having a low load, the time proceeds to period 1. In period 1, the required voltage $V_{comp}$ is lower than the power source voltage $V_{batt}$. Further in period 1, the electric vehicle is not in braking operation. Accordingly, the first electrical circuit 23 is selected by the connection circuit 40 (YES in step 603 and NO in step 608 of FIG. 8). Further, as the electric vehicle accelerates, the required voltage $V_{main}$ of the drive motor inverter 17 increases. In period 1, the output voltage $V_{dc}$ is not related to the operation of the compressor inverter 19, and determined only by the requirement of the drive motor inverter 17. Accordingly, the output voltage $V_{dc}$ increases following the required voltage $V_{main}$ in period 1.

Next, as the electric vehicle decelerates (braking operation), the required voltage $V_{main}$ decreases (period 2). In period 2, the required voltage $V_{comp}$ is lower than the power source voltage $V_{batt}$. Further in period 2, the electric vehicle is in braking operation. Accordingly, the connection circuit 40 selects the second electrical circuit 24 (YES in step 603 and YES in step 608 of FIG. 8), and supplies power obtained from the drive motor 12 to the compressor inverter 19 via the second electrical circuit 24 (regenerative operation). The output voltage $V_{dc}$ decreases following the required voltage $V_{main}$ in period 2.

When the air-conditioning system is switched from the state of period 8 to low load operation, the required voltage $V_{comp}$ decreases. At the timing when the relationship between the magnitude of the power source voltage $V_{batt}$ and the magnitude of the required voltage $V_{comp}$ is reversed, the electric vehicle is in braking operation. Accordingly, the connection circuit 40 selects the second electrical circuit 24 (YES in step 603 and YES in step 608 of FIG. 8), and supplies power obtained from the drive motor 12 to the compressor inverter 19 via the second electrical circuit 24 (regenerative operation) (period 9). The output voltage $V_{dc}$ decreases following the required voltage $V_{main}$ in period 9.

In period 9, when the electric vehicle has stopped, the required voltage $V_{main}$ decreases to zero (period 10). In period 10, the required voltage $V_{comp}$ is lower than the power source voltage $V_{batt}$. Further, the electric vehicle is not in braking operation. Accordingly, the first electrical circuit 23 is selected by the connection circuit 40 (YES in step 603 and NO in step 608 of FIG. 8). The output voltage $V_{dc}$ is equal to the power source voltage $V_{batt}$ in period 10.

Such control as described above enables the power supply device for an electric vehicle 10 to supply a necessary voltage to the compressor inverter 19 even when the required voltage $V_{comp}$ to be supplied to the compressor inverter 19 increases. In addition, the power supply device for an electric vehicle 10 can supply an appropriate voltage to the compressor inverter 19 even when the required voltage $V_{comp}$ to be supplied to the compressor inverter 19 varies. Further, the power supply device for an electric vehicle 10 in this embodiment selects the second state in the connection circuit 40 during braking operation (regenerative operation). This makes it possible to supply power (regenerative power) obtained from the drive motor 12 to the compressor inverter 19 without the intermediation of the DC-DC converter 18. Accordingly, the regenerative power losses in the DC-DC converter 18 can be eliminated.

Although the configuration of the connection circuit 40 of Modified embodiment is different from the configuration of the connection circuit 30 of Embodiment, it is possible to perform such control including regenerative operation also in the configuration of the connection circuit 30 of Embodiment, as in Modified embodiment. However, frequent switching between power running operation and regenerative operation may be needed in some cases, depending on the running state of the electric vehicle. In the case where the connection circuit 40 is employed, the need to stop power supply to the compressor inverter 19 in switching can be eliminated, which allows continuous operation of the compressor motor 14. Accordingly, in the case of performing such control including regenerative operation as in Modified embodiment, the connection circuit 40 as one in Modified embodiment is preferably employed.

Further, it also is possible to connect both the electrical circuit on the grounded side in the first electrical circuit 23 and the electrical circuit on the grounded side in the second electrical circuit 24 to the terminal on the grounded side of the compressor inverter 19 on a constant basis, without providing the sixth switch 45 and the seventh switch 46 of the connection circuit 40, in the same manner as in the connection circuit 30. It should be noted that the inrush limiting resistor 43 may be omitted when the inrush current is sufficiently low.

INDUSTRIAL APPLICABILITY

The present invention can be applied to electric power systems in hybrid vehicles and electrical drive vehicles that use a motor as a power source. Furthermore, the present invention can be applied to other electric power systems.

The invention claimed is:

1. A power supply device for an electric vehicle intended to supply power from a direct current power source to a main motor and an auxiliary motor, the power supply device for an electric vehicle comprising:
    a main circuit having a DC-DC converter that allows a direct current voltage of the power source to be stepped up and a main inverter that drives the main motor using an output from the DC-DC converter;
    an auxiliary circuit having an auxiliary inverter that drives the auxiliary motor, a first electrical circuit that is connected to the main circuit on a primary side of the DC-DC converter, a second electrical circuit that is connected to the main circuit on a secondary side of the DC-DC converter, a connection circuit that is configured to be capable of selecting one of the first electrical circuit and the second electrical circuit as a path for supplying the direct current voltage to the auxiliary inverter; and
    a control device that controls the connection circuit when the main motor is in power running operation so that the first electrical circuit is selected by the connection circuit when a required voltage of the auxiliary inverter is lower than the direct current voltage of the power source while the second electrical circuit is selected by the connection circuit when the required voltage of the auxiliary inverter is equal to or higher than the direct current voltage of the power source.

2. The power supply device for an electric vehicle according to claim 1, wherein
    the control device controls the connection circuit when the main motor is in regenerative operation so that the second electrical circuit is selected by the connection circuit.

3. The power supply device for an electric vehicle according to claim 1, wherein
    the control device controls the DC-DC converter so that the direct current voltage stepped up in the DC-DC converter should be equal to or higher than the required voltage of the auxiliary inverter when the required voltage of the auxiliary inverter is equal to or higher than the direct current voltage of the power source as well as the required voltage of the auxiliary inverter is equal to or higher than the required voltage of the main inverter.

4. The power supply device for an electric vehicle according to claim 1, wherein
the main motor is a drive motor used for running,
the main inverter is a drive motor inverter,
the auxiliary motor is a compressor motor for driving a vehicle air conditioner, and
the auxiliary inverter is a compressor inverter.

5. The power supply device for an electric vehicle according to claim 4, wherein
a required voltage of the compressor inverter is determined in the control device on the basis of a set temperature of the vehicle air conditioner and vehicle interior temperature.

6. The power supply device for an electric vehicle according to claim 2, wherein
the control device controls the DC-DC converter so that the direct current voltage stepped up in the DC-DC converter should be equal to or higher than the required voltage of the auxiliary inverter when the required voltage of the auxiliary inverter is equal to or higher than the direct current voltage of the power source as well as the required voltage of the auxiliary inverter is equal to or higher than the required voltage of the main inverter.

* * * * *